THERMOELECTRIC HEAT EXCHANGE APPARATUS
Filed Dec. 30, 1963 3 Sheets-Sheet 1
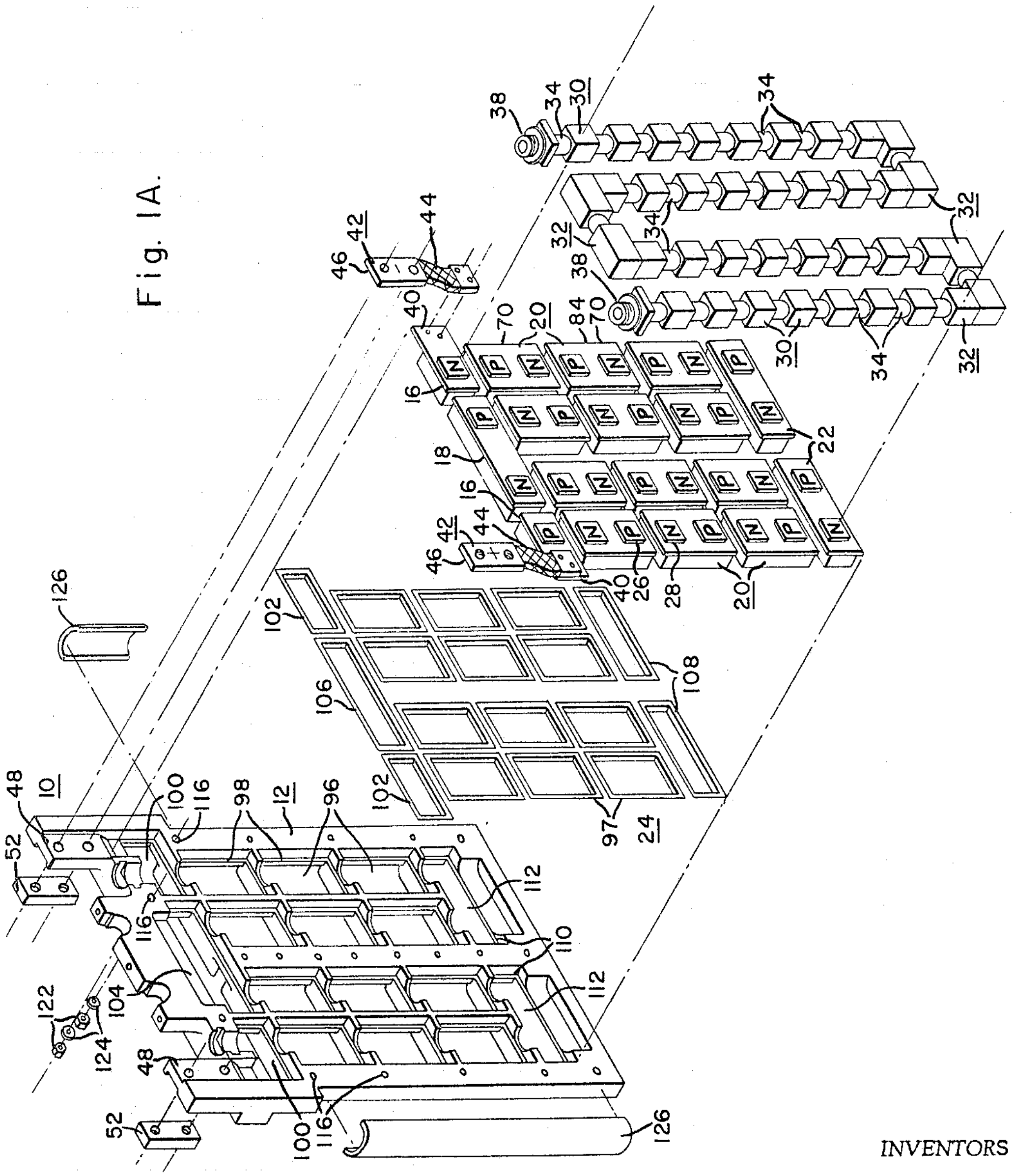
Fig. IA.
INVENTORS
Cecil J. Mole and
Uhle F. Cassidy
BY Zigmund L. Hermer
ATTORNEY

THERMOELECTRIC HEAT EXCHANGE APPARATUS

Filed Dec. 30, 1963 3 Sheets-Sheet 2

THERMOELECTRIC HEAT EXCHANGE APPARATUS

United States Patent Office 3,290,177
Patented Dec. 6, 1966

3,290,177

THERMOELECTRIC HEAT EXCHANGE APPARATUS

Cecil J. Mole, Monroeville, and Uhle F. Cassidy, Cheswick, Pa., assignors to Westinghouse Electric Corporation, Pittsburgh, Pa., a corporation of Pennsylvania
Filed Dec. 30, 1963, Ser. No. 334,241
11 Claims. (Cl. 136—204)

Figure 1B:
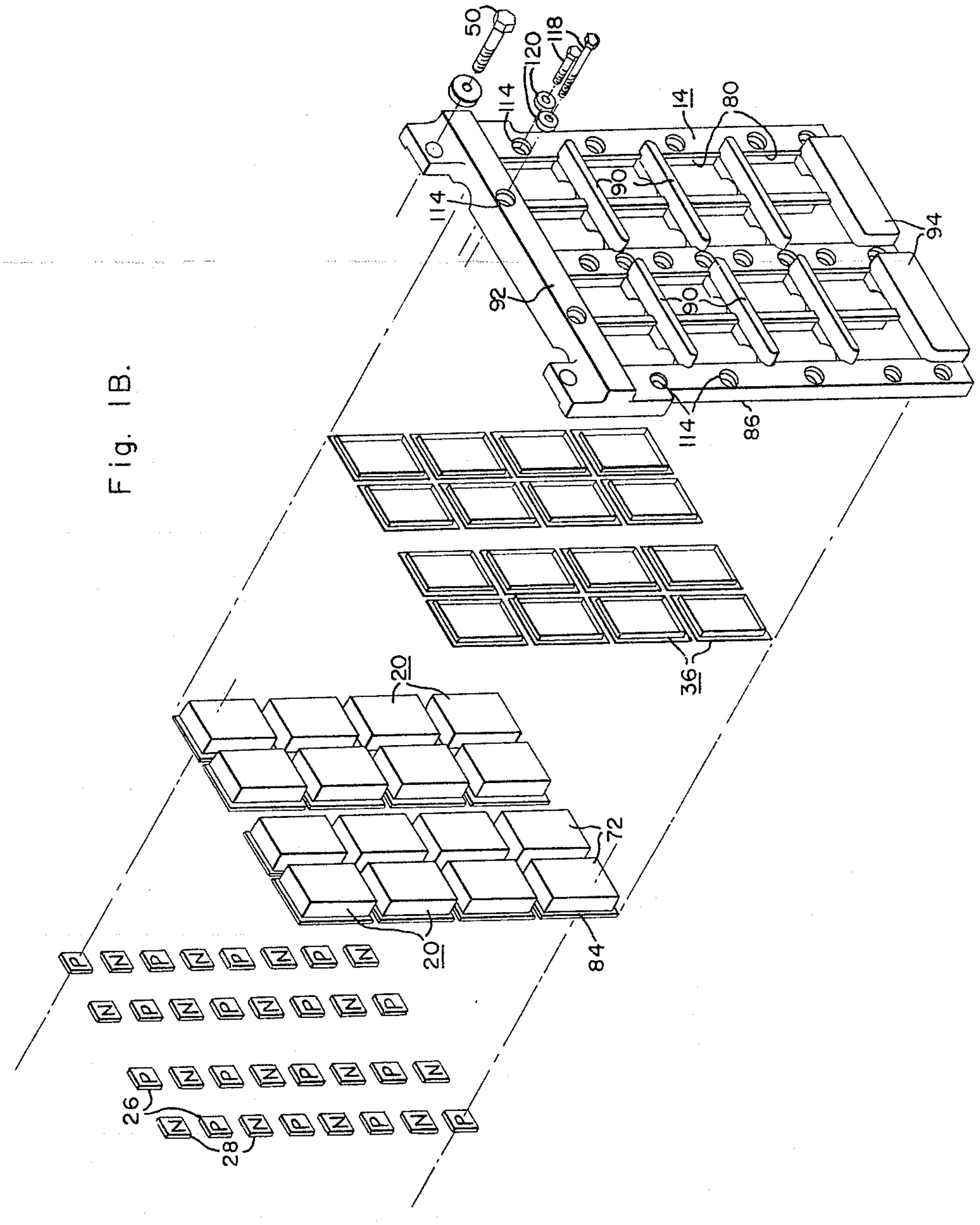

The present invention is directed generally to thermoelectric apparatus and more particularly to a compact and shockproof construction of a thermopile for varying the temperature of fluid media, or for producing through the use of thermoelectric effects electrical power.

The provision of thermoelectric devices for certain applications requires the construction of a themopile arrangement of compact size, lightweight and shockproof construction. In such thermoelectric devices where one of two fluid media is a liquid and the other is a gas, it is desirable to isolate completely the flow passageways for one of the media from the other medium, particularly where one of the passageways includes a number of soldered or brazed joints. In such devices, the thermoelectric pellets are secured to electrically conductive members by a number of soldered or brazed joints. It is important that all of the soldered or brazed joints are not subjected to corrosion due to moisture present in the other medium.

Accordingly, it is an object of this invention to provide a compact, shockproof and efficient thermoelectric construction.

It is a further object of this invention to provide a new and improved thermopile arrangement having a gaseous fluid medium and a liquid fluid medium in adjacent regions of the thermopile with such regions being isolated from one another.

A further object of this invention is to provide a new and improved thermopile of the gas to liquid type having a pair of retaining grids surrounding the liquid region thereof and with the gaseous region disposed outwardly of the retaining grids.

A still further object of this invention is to provide a liquid to air thermopile arrangement wherein the liquid passageways are formed in a plurality of fixedly disposed blocks and with the passageways in each of the blocks being connected together by coupling members capable of absorbing thermal shock induced thereupon by relative motion of the blocks. In such a construction, the blocks are fixedly positioned by grid members with the gaseous heat exchangers of the thermopile protruding through the grid members.

Briefly the present invention accomplishes the above objects by providing a liquid to gas thermoelectric construction or thermopile wherein the liquid flow circuit is formed by a plurality of block members having flow openings formed therein. The flow openings are connected in series by connectors formed from a material having a relatively high electrical resistance. Each of the block members are fixedly disposed relative to one another and the connectors are formed to expand and contract, thereby absorbing stresses induced upon the connectors due to relative motion of the block members caused by thermal expansion or contraction thereof. A pair of retaining grids or frames are provided which sandwich the block members therebetween to fixedly mount each of the block members. The grids are formed such that each of the gaseous heat exchange means of the thermopile protrudes therethrough. Each of the block members is thereby enclosed by the grid structures while the gaseous heat exchange means are disposed outwardly of the grid structures. Suitable shock absorbing means, such as resilient gasketing means, are mounted between the grid structure and adjacent heat exchange portions of the thermopile to absorb shock imparted to the thermopile by exterior forces without casing damage to any of the thermopile parts. The gasketing means also isolate the block members and the connectors mounted therebetween from any moisture carried by the medium flowing past the gaseous heat exchange means. In accordance with the invention, it is contemplated that the connectors are secured to adjacent block members by brazing or soldering. With the isolation of the block members from the moisture in the region adjacent the gaseous heat exchange means, such moisture cannot adversely affect the brazed or soldered joints. The grid structure, in accordance with the invention, is formed of a generally open construction permitting the projection therethrough of heat exchange fins or the gaseous heat exchange means to provide a relatively lightweight construction. The grid structure, in addition, provides guide means thereon for the flow of gas through the gaseous heat exchange means.

In accordance with the invention, a plurality of generally parallelly extending rows of heat conductive blocks are provided with a current flow path formed in each row to extend longitudinally therealong in a serpentine manner. Means are provided for connecting the serpentine current flow paths of each row in series comprising the end ones of the gaseous heat exchange structures which are mounted in bridging relationship across adjacent rows.

Each of the block members is provided with a flow opening therein with the block members in each row having the flow openings thereof connected in series by a plurality of high resistance, flexible connectors. Means are provided for connecting each row of flow openings in series comprising specially formed end block members disposed at the ends of the rows and flexible connectors coupling the flow passageways of each end block and simultaneously retaining the hermetic integrity of the liquid flow path.

Further objects and advantages of this invention will become more readily apparent as the following description proceeds, wherein features of novelty which characterize the invention will be pointed out with greater particularity.

Figure 3:
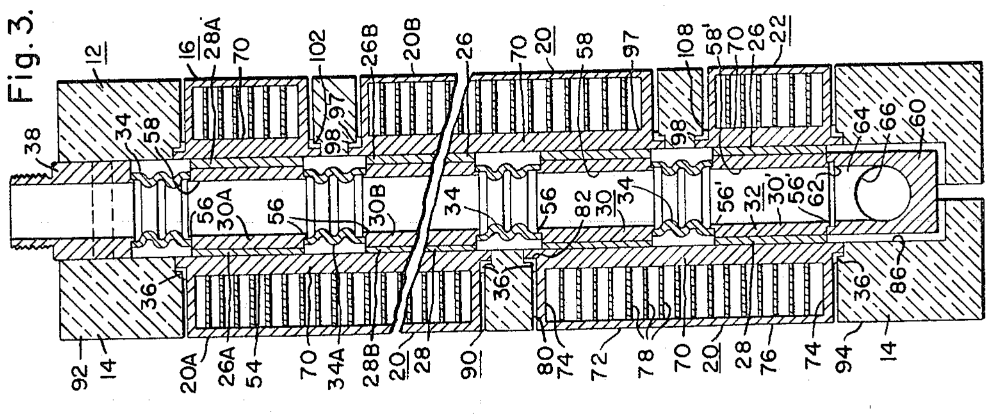
Figure 2:
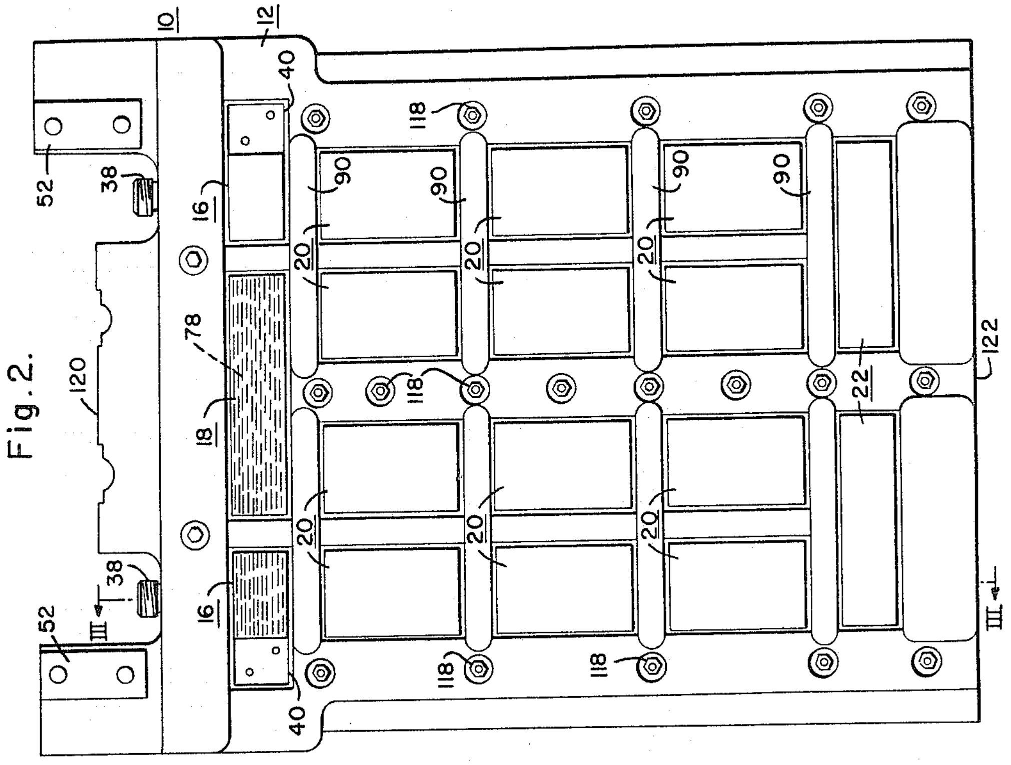

For a better understanding of the invention, reference may be had to the accompanying drawings, in which:

FIGURES 1A and 1B when disposed in alignment in accordance with the dot-dash lines thereof comprises an exploded view of a thermoelectric construction embodying the principles of this invention;

FIG. 2 is a bottom plan view of the thermoelectric construction of FIGS. 1A and 1B; and FIG. 3 is an enlarged sectional view of the thermoelectric construction of FIGS. 1A and 1B, and of FIG. 2 taken substantially along the lines III—III of FIG. 2.

Referring now to the embodiment of the invention illustrated in the drawings, it will be appreciated from the exploded views of FIGS. 1A and 1B that a thermopile 10 constructed in accordance with the principles of this invention includes lower and upper retaining grid structures 12 and 14 respectively formed of a generally open construction from suitable materials such as polyester glass or from molded resinous materials. Fitted within openings in the lower grid structure 12 are a plurality of differently sized heat exchange structures designated by the reference characters 16, 18, 20 and 22 which extend through the complementary openings, as will be hereinafter more fully explained. To provide a shock-proof mounting for the thermopile 10, a plurality of differently sized annular gasket means 24 are interposed between the heat exchange structures 16, 18, 20 and 22 and the peripheries of the openings in the lower grid 12 with each gasket means 24 being shaped to conform to the corresponding peripheral shapes of the grid openings and heat exchange structures. A lower group of spaced pellets 26 and 28 of thermoelectric material are positioned in a plurality of coplanar rows and are secured to the heat exchange structures 16, 18, 20 and 22 in a predetermined array. The pellets 26 and 28 are secured to the heat exchange structure by suitable means such as by a soldered joint, made at a relatively low temperature, or by brazing. The reference character 26 designates a thermoelectric pellet of thermoelectrically positive material, and pellets of thermoelectrically negative material are designated by the reference character 28. A plurality of coplanar rows of block members or modules 30 formed from electrically and thermally conductive material are secured to the thermoelectric pellets 26 and 28 by suitable means, such as by soldering or brazing. In each row, certain of the end block members or modules 32 are generally L-shaped and serve to join flow passageways of adjacent rows of blocks in series in a manner to be described.

Each of the block members 30 and 32 desirably is provided with a flow passageway 58 for providing a flow path for a liquid heat exchange medium. The passageways in each block 30 and 32 of each row is connected in series by coupling members 34 illustrated herein as bellows. Each bellows 34 is formed from a material having a high electrical resistance and shaped to absorb relative motion of adjacent blocks 30 and 32. An upper group of heat exchange structures conforming in size and shape to the heat exchange structure 20 and designated by the same reference character are secured in bridging relationship across adjacent ones of coplanar rows of thermoelectric pellets 26 and 28 forming an upper group or layer of pellets. The upper grid structure 14 receives the upper layer of heat exchange structures 20 is complementarily shaped openings therein. Interposed between the peripheries of the upper group of heat exchange structures 20 and the upper grid structure 14 are gasketing means 36 formed to promote a shockproof mounting of the thermopile 10. The gasketing means serves where necessary, as insulating means between the thermopile 10 and the grid 14, in the event the grid 14 is formed from an electrically conductive material. A pair of fluid connectors 38 are coupled to the upper left-hand block member 30 and the upper right-hand block member 30 (as viewed in FIG. 1A) by suitable means such as by high resistance connectors or bellows 34 for the purpose of connecting the fluid passageway of the thermopile 10 to suitable supply and exhaust conduits (not shown) for transporting liquid to the thermopile 10.

Each of the upper left-hand and upper right-hand heat exchange structures 16 (FIG. 1A) of the lower group of heat exchange structures is provided with a sidewardly extending base or plate 40 thereon to which an electrically conducting terminal 42 is secured by a suitable means such as by mounting bolts. The terminal structures 42 each includes a conductive flexible strap 44 thereon formed desirably from braided conductive material and a terminal plate 46. Each terminal plate 46 is received on an upwardly extending, integrally formed surface 48 disposed on the lower grid structure 12 and fixedly positioned in engagement with the surfaces 48 by suitable means such as by mounting bolts 50 which extend through aligned openings in terminal plate 46, surface 48 and threaded retainers 52.

The electrical flow path through the thermopile extends from the positive terminal 42 (located to the left of FIG. 1A) to the adjacent base 40 of the heat exchange structure 16, through the thermopile 10 to the negative terminal 42 (located at the right in FIG. 1A).

More specifically, (viewing FIGS. 1A and 1B) from plate 40 of left hand heat exchange structure 16, current passes through the thermoelectric layer 26 secured to heat exchanger 16, through the upper left hand block 30 in the extreme left hand row of blocks to the upper left hand pellet 28 in the extreme left hand row of pellets and therefrom to the upper left hand heat exchanger 20 in the upper group of heat exchangers. Each heat exchanger 20 in the upper group is connected in bridging relationship to two adjacent thermoelectric pellets in the corresponding vertical row of thermoelectric pellets. Similarly the heat exchangers 20 of the lower group of heat exchangers are connected in bridging relationship with two adjacent thermoelectric pellets, as shown in FIG 1A, with the heat exchanger 20 of the upper and lower groups bridging such pellets 26 and 28 in an alternating manner (as shown in FIG. 3) to provide a serpentine current flow path through each heat exchanger 20, thermoelectric pellets 26 and 28 and through each block member 30. The heat exchangers 22 serve to bridge electrically the lower thermoelectric pellets of the extreme left and center left rows of pellets and the lower pellets of the center right and extreme right rows. The heat exchanger 18 bridges the upper ones of the thermoelectric pellets in the center left and center right rows so that each of a series current flow path through each thermoelectric pellet results.

As FIG. 3 is a section view through the extreme left row of blocks 30 of FIG. 1, the following description of the current flow path will be made in terms of electron flow rather than conventional current flow through thermopile 10. It will be seen from FIG. 3 that the electrical flow path (in terms of electron flow) passes from heat exchanger 16 through the adjacent thermoelectric layer 28A and then transversely through the electrically conducting block member 30A to thermoelectric layer 26A. From the thermoelectric layer 26A, the electron flow passes to the base section 54 of the heat exchange structure 20A with the base 54 being mounted in bridging relationship across the thermoelectric layer 26A and coplanar thermoelectric layer 28B. From the thermoelectric layer 28B, the electron flow path extends through the block or module 30B and therefrom through the thermoelectric layer 26B heat exchange structure 20B and therefrom in a serpentine manner through each of the thermoelectric layers, heat exchange structures and modules 30 to the left-hand terminal structure 42 of FIG. 1A. Inasmuch as each of the connectors 34 desirably is formed of a high resistance material when compared with the resistance along the aforedescribed current flow path, only small portions of the total electrical current bypasses the thermoelectric layers 30A and 30B along the path from the module 30A through the connector 34A to the module 30B.

As will be appreciated by those skilled in the art, each of the connectors or bellows 34 desirably is formed from a material which is compatible metallurgically with the material forming the modules 30. More particularly each of the modules 30 is provided with a pair of flanges 56 extending outwardly from the ends thereof and disposed circumferentially of the flow openings 58 in the modules 30. The connectors 34 desirably are sized to closely receive therein the circumferential flanges 56 and a suitable hermetic joint is formed between the flanges 56 and the connectors 34 by means well known in the art such as by brazing or soldering.

It must be realized that by "high electrical resistance" it is meant that the total resistance of the coupling members of his invention such as the bellows 34 desirably is of such a magnitude that the flow of current across the bellows is less than 5% and in most instances is no more than 1 or 2% of the total current flow through the thermopile 10. The specific composition of material forming such coupling members is chosen from the group of relatively high resistance material which materials are sufficiently compatible with the material forming the modules 30 and 32 to permit a good hermetic joint to be formed therebetween. In choosing of material for the bellows 34, it is to be realized that the electrical resistivity of the material must be considered. However, it is to be further realized that it is the total resistance across the bellows which determines its suitability for use with the thermopile 10. The total resistance across the bellows is directly proportional to the length of the bellows and inversely proportional to the cross-sectional area of the material forming the bellows. The corrugated form of the bellows serves to increase the effective length and, therefore, the resistance thereacross. In addition, each bellows is formed from relatively thin material, thereby reducing its cross-sectional area, to increase further the total resistance of the bellows.

Viewing FIGS. 1A and 1B, it will be appreciated that the group of block members in the left hand row are connected together electrically by the upper and lower groups of heat exchange structures with the heat exchange structures being secured respectively in bridging relationship across adjacent block members in an alternating manner to produce the serpentine electrical current flow path. Two L-shaped block members 32 are mounted in juxtaposed relationship at the lower ends of the extreme left and cener left rows of block members of FIG. 1A, and the left-hand heat exchange structure 22 is mounted in bridging relationship across the last mentioned block members 32 to connect electrically the current flow path of the extreme left row to the current flow path of the center left row. Similarly, at the upper end of the center left row and center right row there are provided a second pair of juxtaposed L-shaped block members 32 which are connected in bridging relationship by the heat exchange structure 18 and associated thermoelectric pellets to couple the last mentioned block members 32 together electrically, thereby connecting the electrical flow path over the center left row to the electrical flow path of the center right now. At the lower end of the center right-hand row of FIG. 1A and of the extreme right hand row thereof, a third pair of juxtaposed L-shaped block members 32 are provided and the electrical flow paths of each of the last-mentioned rows are connected in series by the right-hand heat exchange structure 22 and the thermoelectric layers associated therewith.

As has been pointed out, in each of the rows intermediate the extremities thereof, the heat exchange structures 20 are secured in bridging relationship across adjacent block members in an alternating manner, as illustrated specifically in FIG. 3. As a result, an electrical flow path is provided between each of the terminals 42 which passes through each of the thermoelectric layers 26 and 28, each of the heat exchange structures 16 and 18, 20 and 22, each of the modules or block members 30 and 32 to effect thermoelectric heating or cooling in the heat exchange structures and in the block members 30 and 32.

As seen in FIG. 1A, a series liquid flow path is formed through each of the block members 30 and 32 by means of the connectors or bellows 34. Each of the block members 30 includes the central opening 58 (FIG. 3) extending longitudinally therethrough with adjacent openings 58 being connected in series by bellows 34 secured to adjacent block members 30 in the manner heretofore described.

Each of the L-shaped block members 32, in this example of the invention, is provided with a generally L-shaped opening therethrough with the block members 32 being formed from a separate pair of heat conductive block members 30′ and 60 having the openings formed in each one of the block members prior to final assembly thereof. More specifically (viewing FIG. 3) the lower block member 32 includes as the upstanding portion a block 30′ which is formed exactly as the blocks 30 of the thermopile 10. The block member 30′ includes the central opening 58′ formed therein and the circumferential shoulders 56′ extending outwardly from the opposed ends of the block member 30′ with the upper shoulder being hermetically secured to the adjacent bellows 34. The lower or base portion 60 of the block member 32 is provided at its upper end with a circular shallow recess 62 formed therein which receives the adjacent shoulder 56′ of the block member 30′ therein. An opening 64 extends downwardly from the lower surface of the recess 62 to a position substantially centrally of the lower block 60 and a transverse opening 66 extends longitudinally through a substantial portion of the base 60 with the opening 66 extending horizontally (FIG. 3) and communicating with the vertical passageway 64. The pieces 30′ and 60 of each module and block member 32 are secured together hermetically at positions adjacent the flange 56′ and recess 62 by suitable means such as by brazing or soldering.

Each of the base members 60 is provided with a shoulder (not shown) similar to the shoulders 56 and 56′ to which the adjacent bellows structure 34 may be secured for the purpose of connecting the flow opening of one of the block members 32 to the corresponding flow opening in a juxtaposed block member 32. In this manner each of the flow openings 58′ and 64 and 66 of each of the rows are connected in series with the upper left hand flow opening 56 of the extreme left row being connected to a connector 38 and the corresponding block member 30 of the extreme right hand row being coupled to another connector 38 by similar bellows structures 34, as illustrated in detail in FIG. 3.

As illustrated in FIG. 1A, the current flow path of the thermopile 10 extends in series from a thermoelectric layer of one conductivity type to a thermoelectric layer of the opposite conductivity type. It is to be realized that as said conventional electrical current flow from a thermoelectrically N-type material to a thermoelectrically P-type material, a cooling effect is imparted to the material between the thermoelectric layers. Similarly as conventional current flows from thermoelectrically P-type material to thermoelectrically N-type material, a heating effect takes place therebetween. In the arrangement illustrated herein, the direction of current flow and the polarity of the thermoelectric layers are chosen for the illustrative purposes of this specification, such that thermoelectric heating is imparted to each of the block members 30 and 32 while thermoelectric cooling is imparted to each of the heat exchange structures 16, 18, 20 and 22 respectively. It is to be realized that an opposite effect may take place by merely reversing the polarity of the direct current flow through the thermopile 10 or by reversing the conductivity type of the thermoelectric layers throughout the thermopile 10, whereby thermoelectric cooling in each of the block members 30 or 32 will result and thermoelectric heating of each of the heat exchange structures 16, 18, 20 and 22 will occur.

It will be further appreciated that the thermopile 10 can also act as a thermoelectric generator by merely supplying relatively cool fluid to one of the heat exchange means such as to the heat exchange structures 16, 18, 20 and 22 and relatively warm fluid to the remaining heat exchange structure such as the flow passageways 58. In this manner electrical current will be produced at each of the thermoelectric junctions in the thermopile 10 thereby providing electrical power across each of the terminal structures 42.

Each of the heat exchange structure 16, 18, 20 and 22 are formed (as seen in FIGS. 2 and 3) to include a base member referred to by the reference character 70 for each of the heat exchange structures 16, 18, 20 and 22. Each of the base members 70 are secured to the thermoelectric layers 26 and 28 with each base 70 being formed from electrically conductive material to form an electrical bridge across the thermoelectric layers that are secured thereto.

Extending laterally from each of the base members 70 in a generally U-shaped frame for example the frame 72 of the lower left-hand heat exchange structure 20 of FIG. 3 with the frame 72 having its legs 74 extending laterally from the horizontally extending edges of the base 70 and bridged by a member 76 which extends parallel to the base 70. Extending laterally between the member 76 and base 70 in a horizontal direction as viewed in FIGS. 2 and 3 are a plurality of spaced fins 78 which are formed from thermally conductive material and which serve to enlarge the heat exchange area of each of the heat exchange structures 16, 18, 20 and 22. The fins 78 are also illustrated in dotted lines in FIG. 2 and extend transversely across the thermopile 10 when the latter is assembled.

In the construction of thermopiles such as the arrangement 10 of this invention, it is desirable to maintain a hermetically sealed liquid flow passage arrangement for the thermopile 10. In furtherance of this purpose, a hermetic joint is made between each of the bellows 34 and the adjacent flanges 56 of adjacent block members 30. It is important to maintain the integrity of each of the latter hermetic joins. As a result it has been determined that the effects of an ambient atmosphere containing substantial moisture may be detrimental to the hermetic joints between the block members 30 and bellows 34. It is therefore desirable to isolate the ambient atmosphere adjacent each of the bellows 34 to minimize the amount of moisture in the ambient atmosphere.

It will be appreciated that the air flowing through each of the heat exchange structures 16, 18, 20 and 22 contains therein moisture, which moisture adversely affects not only the joints between block members 30 and 32 and bellows 34, but also the joints between the block members 30 and 32, heat exchangers 16, 18, 20 and 22 and the thermoelectric pellets 26 and 28. In accordance with the invention, means are provided to isolate the atmosphere adjacent each of the bellows 34 and each pellet 26 and 28 from the air flowing through the heat exchange structures 16, 18, 20 and 22. Such means also provide a shockproof arrangement permitting the use of the thermopile 10 and apparatus which may be from time to time subjected to severe shock.

The last mentioned means comprises each of the grid structures 12 and 14 with the grid structure 14 having a plurality of openings 80 therein both positioned and shaped to receive therein the upper layer of heat exchange structures 20. Each of the openings 80 corresponds in size to the periphery of each of the heat exchange structures 20, and is formed with a shoulder 82 thereon which is positioned to engage a flanged portion 84 located at the periphery of each of the heat exchange structures 20 adjacent the base 70 thereof. The U-shaped structure 72 and fins 78 of each of the heat exchange structures 20 extend outwardly through the openings 80 so that each of the bellows 34 and block members 30 and 32 are positioned beneath the lower side 86 of the grid structure 14. During operation of the thermopile 10, a suitable gaseous medium, for example air, is passed into intimate contact with each of the heat exchange structures of the thermopile 10 and through the openings between spaced fins 78 thereof. Means are provided for preventing the air flow, which normally contains moisture therein, from communicating with the bellows 34. Such means comprise the gasketing means 36 of FIG. 1A which are generally of a picture frame construction having an L-shaped cross section and which are interposed between the heat exchange structures 20 and the grid structures 14. More particularly, each gasketing means 36 is positioned between the shoulder 82 and the flange 84 formed on base 70. The gasketing means 36 desirably is formed from a resilient material so that each of the gaskets 36 is mounted in compression thereby preventing the passage of air therethrough into engagement with the block members 30 and 32, pellets 26 and 28, and bellows 34. The lower frame 14 is provided with a plurality of laterally extending guide means 90 formed integrally thereon and disposed between adjacent ones of the heat exchange structures 20 with the guide means 90 extending parallelly with the fins 78. Each of the guide means 90 extends outwardly from the frame 14 in an amount equal to the outward extent of the frame 72 of the heat exchange structures 20. As seen in FIG. 3, the outward ends of each heat exchange structure 20 and the guide means 90 are substantially coplanar. The frame 14 is provided at its upward end with an outwardly extending transverse projection 92 which extends outwardly therefrom an amount equal to the corresponding extent of the guide means 90. Similarly, at the lower end of the frame 14, a pair of guide means 94 of relatively heavier construction are positioned to extend outwardly in an amount corresponding to the outward extent of the guide means 90 and 92. With the guide means 90, each of the heat exchange structures 20 are nested closely between adjacent guide means of the frame 14 so that flow passageways through the heat exchange structures 20 are formed by the frame 14 with the gas being cooled passing laterally across the frame 14.

The other side of the thermopile 10 is enclosed by a similar grid 12 with the grid 12 having a plurality of openings 96 therein which receive the heat exchange structures 20 of the upper group of heat exchange structures on shoulders 98, corresponding to the shoulders 82 of openings 80 in frame 14. Each of the heat exchange structures 20 also having the outward peripheral flange 84 extending outwardly from the bases 70 thereof, respectively, so that when each heat exchange structure 20 in the upper layer is disposed in its opening 96 of the upper grid 12, the corresponding gasket means 97 of the lower group of gaskets 24 are positioned in comparison between the shoulders 98 and the peripheral flange 84. In the grid frame 12 there are provided twelve openings 96 for receiving the twelve heat exchange structures 20 of the lower group. In addition, there are provided two openings 100 which are sized to receive the two heat exchange structures 16, together with the extensions 40 thereof. The heat exchange structures 16 are positioned in the openings 100 in the same manner as the heat exchange structures 20 are positioned within the openings 96. In furtherance of this purpose a specially shaped gasketing means 102 are interposed between each of the heat exchange structures 16 and the shoulders formed adjacent the periphery of the openings 100 in grid 12. Similarly the grid structure 18 is positioned in a correspondingly shaped opening 104 in the grid 12 with a gasket 106 interposed between heat exchange structure 18 and the peripheral shoulder of opening 104. Each of the bridging heat exchange structures 22 are provided with peripheral gaskets 108 which are positioned in engagement with shoulders 110 formed in openings 112 in grid 12.

Assembly of the thermopile 10 is achieved by clamping the grids 12 and 14 together to form a generally sandwiched mounting of the modules 30 and 32. In furtherance of this purpose, each of the grids 12 and 14 are provided with aligned openings 114 and 116 therein respectively through which mounting bolts 118 having resilient washers 120 are passed with the bolts 118 being threadedly secured to appropriate nuts 122 with resilient washers 124 clamped between the nuts 122 and the frame 12. Each of the mounting bolts 118 is tightened to a degree sufficient to compress each of the gasketing means 36, 24, 102, 106 and 108 and each of the resilient washers 120 and 124 to prevent the passage of air between the heat exchange structures and the grids 12 and 14 adjacent the mounting bolts 18, respectively.

Inasmuch as each of the longitudinal sides of the grids 12 and 14 are spaced apart, a pair of longitudinally extending deflecting means 126 are secured along the longitudinal sides of the grids 12 and 14 to prevent the flow of air into the region occupied by the modules 30 and 32 and bellows 34. Each of the deflectors 126 form with a generally semicircular cross section so that the longitudinal edges thereof are secured in a hermetic manner to the longitudinal sides of the grids 12 and 14 and to provide further a path creating a smooth flow of air toward the heat exchange means 16, 18, 20 and 22.

In this example of the invention, it is contemplated that air flow into the heat exchanger will move only in a direction parallel to fins 75. As a result there are provided no means for sealingly enclosing the upper and lower ends 120 and 122 of thermopile 10. If desired, gasketing means may be interposed between grids 12 and 14 adjacent ends 120 and 122 thereof, and about the entire outer periphery of grids 12 and 14.

It will be appreciated that the grids 12 and 14 fixedly position each of the heat exchange structures 16, 18, 20 and 22 relative to one another. Inasmuch as each of the block members 30 and 32 are secured to two of the heat exchange structures through a pair of thermoelectric layers, the grids 12 and 14 also serve to fixedly position the block members 30 and 32. Each of the connectors or bellows are formed to absorb therein any changes in the spacing between block members 30 and/or 32 to which such bellows 34 are secured. Such spacing changes occur because of thermal expansion and contraction of the block members 30 and 32 arising during transient operation of the thermopile 10. Thus, the thermopile 10 results in a construction which is resistant to thermal shock while still retaining a substantial resistance to shock caused by impact forces.

In this example of the invention, each of the grids 12 and 14 are desirably formed from a lightweight insulating material, for example from a polyester glass composition. It is to be realized however, that the grids 12 and 14 may be formed from an electrically conductive material and that the aforedescribed construction of the thermopile 10 may still be utilized therewith inasmuch as insulating means such as the gaskets 24, 36, 102, 106 and 108 are interposed between each of the heat exchange structures 20, 16, 18 and 22, respectively to preserve the integrity of the desired electrical flow path through the thermopile 10. In addition, as shown in FIGS. 2 and 3, each of the heat exchange structures is spaced from the grids 12 and 14 to prevent electrical short circuiting. It will be realized, however, that should the grids 12 and 14 be formed from electrically conductive material, a different mounting arrangement for the terminals 42 will be necessary.

Each of the heat conductive blocks 30 and 32 and the inlet and outlet conduits 38 desirably are formed from a suitable electrically conductive and heat conductive material, for example from copper or aluminum. The thermoelectric pellets 28 and 36 may be formed from any suitable thermoelectric material such as bismuth telluride, and the heat exchange structures 16, 18, 20 and 22 desirably are formed from a material having good thermal and electrical conductivity properties for example from copper or aluminum. The connectors or bellows 34 desirably are formed from a material metallurgically compatible with the material forming the blocks 30, 32 and 38 to effect a good hermetic joint therebetween, for example from certain stainless steels, titanium alloys or from nickel chromium iron alloys, sold commercially under the names Inconel and Inconel-X. The gaskets 36, 97, 102, 106 and 108 and washers 120 and 124 are formed desirably from a resilient insulating material, for example from molded rubber and the flow directing means 126 may be formed from any material which can be suitably secured to the grids 12 and 14, for example from the same material forming the grids 12 and 14.

It is to be realized that many modifications may be made in the example of the invention described in detail herein without departing from the broad spirit and scope of this invention. Accordingly it is specifically intended that the above-description be interpreted as illustrative of this invention rather than as limitative thereof.

We claim as our invention:

1. In a thermoelectric heat exchange apparatus, a pair of spaced block members formed from thermally and electrically conductive material, a layer of thermoelectric material mounted on one of said block members, an electrically conductive heat exchange structure including a base member and a plurality of spaced laterally extending fins, said base being secured to said thermoelectric layer, means including said base an electrically conductive path between said thermoelecric layer and the other of said block members, a grid structure having at least one opening therein and fixedly positioning said blocks relative to one another, and said spaced fins projecting through said opening in said grid structure.

2. In a thermoelectric heat exchange apparatus, a pair of spaced block members formed from thermally and electrically conductive material, a layer of thermoelectric material mounted on one of said block members, an electrically conductive heat exchange structure including a base member and a plurality of spaced laterally extending fins, said base being secured to said thermoelectric layer, means including said base forming an electrically conductive path between said thermoelectric layer and the other of said block members, a grid structure having at least one opening therein and fixedly positioning said blocks relative to one another, and said spaced fins projecting through said opening in said grid structure, each of said blocks having an opening formed therein, a coupling member for connecting said openings in series, said coupling member being formed from a material having a high electrical resistance thereacross and being formed to absorb stresses induced therein by a variation in the spacing between said block members due to thermally induced movement thereof.

3. In a thermoelectric heat exchange device, at least three block members formed from thermally and electrically conductive material, one of said block members having a pair of thermoelectric layers mounted on spaced surfaces thereof, the second and the third of said block members each having at least one layer of thermoelectric material mounted on a surface thereof, respectively, a first and a second electrically conductive heat exchange structure, each of said heat exchange structures including a base member in a plurality of spaced laterally extending fins thereon, one of said heat exchangers having its base member mounted in bridging relationship between the thermoelectric layer mounted on said second block member and one of said pairs of thermoelectric layers, the base member of the second of said heat exchange structures being mounted in bridging relationship between the thermoelectric layer mounted on said third block member and the other of said pair of thermoelectric layers, a grid structure for fixedly positioning said block members relative to one another, said grid structure having a pair of openings formed therein, and said fins extending through said openings.

4. In a thermoelectric heat exchange device, at least three spaced block members formed from thermally and electrically conductive material, one of said block members having a pair of thermoelectric layers mounted on spaced surfaces thereof, the second and the third of said block members each having at least one layer of thermoelectric material mounted on a surface thereof respectively, a first and a second heat electrically conductive exchange structure, each of said heat exchange structures including a base member in a plurality of spaced laterally extending fins thereon, one of said heat exchange structures having its base member mounted in bridging relationship between the thermoelectric layer mounted on said second block mmeber and one of said pairs of thermoelectric layers, the base member of the second of said heat exchange structures being mounted in bridging relationship between the thermoelectric layer mounted on said third block member and the other of said pairs of thermoelectric layers, a generally hollow grid structure for fixedly positioning said block members relative to one another, said grid structure having a pair of openings formed therein, said fins extending respectively through said openings, each of said block members having passageways formed therein, means for connecting said passageways in series including a pair of connectors formed from relatively high electrical resistance material and secured hermetically at their ends between adjacent block members, respectively, said grid structure being positioned to enclose said connectors, and means coupled to said grid structure for preventing the flow of a heat exchange medium communicating with said fins from entering the region enclosed by said grid structure.

5. In a thermoelectric heat exchange device, at least three spaced block members formed from thermally and electrically conductive material, one of said block members having a pair of thermoelectric layers mounted on spaced surfaces thereof, the second and the third of said block members each having at least one layer of thermoelectric material mounted on a surface thereof respectively, a first and a second electrically conductive heat exchange structure, each of said heat exchange structures including a base member in a plurality of spaced laterally extending fins thereon, one of said heat exchange structures having its base member mounted in bridging relationship between the thermoelectric layer mounted on said second block member and one of said pairs of thermoelectric layers, the base member of the second of said heat exchange structures being mounted in bridging relationship between the thermoelectric layer mounted on said third block member and the other of said pairs of thermoelectric layers, a generally hollow grid structure for fixedly positioning said block members relative to one another, said grid structure having a pair of openings formed therein, said fins extending respectively through said openings, each of said block members having an opening formed therein, means for connecting said openings in series including a pair of connectors formed from relatively high electrical resistance material and secured hermetically at their ends between adjacent block members, respectively, said grid structure being positioned to enclose said connectors, said connectors being formed to absorb forces exerted thereon by a variation in the spacing between said block members, and means coupled to said grid srtucture for preventing the flow of a heat exchange medium communicating with said fins from entering the region enclosed by said grid structure 6. In a thermoelectric heat exchange device, a pair of spaced rows of spaced block members, each of said block members having an opening formed therein, means for connecting said openings of each of said rows in series, respectively, means for connecting the series connected openings of one of said rows in series with the corresponding openings of the other of said rows, said means comprising a pair of opposed end block members disposed at ends of said rows, respectively, said end block members each having a generally L-shaped opening formed therein with one end of each of said generally L-shaped opening being connected to the series connected openings of said rows, respectively, the other ends of said L-shaped openings being positioned in opposed relationship with one another, a generally annular connector disposed between and secured to said end block members, respectively, to form a passageway between said other end of one of said L-shaped openings and the corresponding end of the other of said L-shaped openings.

7. In a thermoelectric heat exchange device, a pair of spaced rows of spaced block members, each of said block members having an opening formed therein, means for connecting said openings of each of said rows in series, respectively, means for connecting the series connected openings of one of said rows in series with the corresponding openings of the other of said rows, said means comprising a pair of opposed end block members disposed at ends of said rows, respectively, said end block members each having a generally L-shaped opening formed therein with one end of each of said generally L-shaped openings being connected to the series connected openings of said rows, respectively, the other ends of said L-shaped openings being positioned in opposed relationship with one another, a generally annular connector positioned axially between and secured to said end block members, respectively, to form a passageway between said other end of one of said L-shaped openings and the corresponding end of the other of said L-shaped openings, said connector being formed from a material having a relatively high electrical resistance along its axial dimension, said connector also being formed to absorb axial forces exerted thereon caused b ythe change in spacing between said end block members.

8. In a thermoelectric heat exchange device, a pair of spaced rows of spaced block members, each of said block members having an opening formed therein, means for connecting said openings of each of said rows in series, respectively, means for connecting the series connected openings of the other of said rows, said means comprising a pair of opposed end block members disposed at ends of said rows, respectively, said end block members each having a generally L-shaped opening formed therein with one end of each of said generally L-shaped openings being connected to the series connected openings of said rows, respectively, the other ends of said L-shaped openings being positioned in opposed relationship with one another, a generally annular connector positioned axially between and secured to said end block members, respectively, to form a passageway between said other end of one of said L-shaped openings and the corresponding end of the other of said L-shaped openings, said connector being formed from a material having a relatively high electrical resistance along its axial dimension, said connector also being formed to absorb axial forces exerted thereon caused by the change in spacing between said end block members, a pair of thermoelectric layers mounted on said end block members, respectively, a heat exchange structure including a base and a plurality of laterallly extending spaced fins, said base being secured in bridging relationship between said layers of thermoelectric material, said base being formed from an electrically conductive material to provide an electrically conductive path between said thermoelectric layers.

9. In a thermoelectric heat exchange device, a pair of spaced rows of spaced block members, each of said block members having an opening formed therein, means for connecting said openings of each of said rows in series, respectively, means for connecting the series connected openings of one of said rows in series with the corresponding openings of the other of said rows, said means comprising a pair of opposed end block members disposed at adjacent ends of said rows, respectively, said end block members each having a generally L-shaped opening formed therein with one end of each of said generally L-shaped openings being connected to the series connected openings of said rows, respectively, the other ends of said L-shaped openings being positioned in opposed relationship with one another, a generally annular connector positioned axially between and secured to said end block members, respectively, to form a passageway between said other end of one of said L-shaped openings and the corresponding end of the other of said L-shaped openings, said connector being formed from a material having a relatively high electrical resistance along its axial dimension, said connector also being formed to absorb axial forces exerted thereon caused by the change in spacing between said end members, a pair of thermoelectric layers mounted on said end block members, respectively, the heat exchange structure including a base and a plurality of laterally extending spaced fins, said base being secured in bridging relationship betwen said layers of thermoelectric material, said base being formed from an electrically conductive material to provide an electrically conductive path between said thermoelectric layers, means for fixedly positioning said block members relative to one another, said means including a pair of support members for clamping each of said block members therebetween, one of said support members having an opening formed therein for receiving said spaced fins therethrough, and means interposed between the periphery of said opening and said base for preventing the flow of a fluid medium which passes in engagement with said fins from passing into the region between said support members.

10. In a thermoelectric heat exchanger, the combination comprising a plurality of tandemly positioned block members, each of said block members having an opening formed therein, a plurality of annular bellows formed from a high electrical resistance material positioned axially between and secured to adjacent block members for connecting said openings in series, respectively, each of said block members having a pair of opposed surfaces, a first group of pellets of thermoelectric material secured to corresponding ones of said pairs of surfaces, respectively, a second group of thermoelectric pellets secured to the others of said surfaces of said pairs of surfaces, respectively, a first group of electrically conducting heat exchange structures secured to predetermined pairs of pellets of said first pellet group, said heat exchange structures having a base member mounted in bridging relationship between said predetermined pellet pairs of said first pellet group, a plurality of laterally extending spaced fins secured to each of said base members, a second group of heat exchange structures secured to predetermined pairs of pellets of said second pellet group, said last-mentioned group of heat exchange structures each including a base member mounted in bridging relationship between said last-mentioned pellet pairs, said predetermined pellet pairs of each of said pellet groups being selected such that said groups of heat exchange structures form a serpentine electrical current flow path in series through each of said block members and each of said thermoelectric layers, said second group of heat exchangers having a plurality of spaced fins extending laterally from each of the bases thereof, a first grid member having a plurality of openings therein positioned adjacent one of said opposed sides of said block members, said spaced fins of said first group of heat exchange structures extending through said openings, respectively, a second grid member positioned adjacent the other of said opposed surfaces of said block members and having a plurality of openings formed therein, said fins of said second group of heat exchange structures extending through said last-mentioned openings, gasket means interposed between said grid structures and said heat exchange structures adjacent the peripheries of each of the bases of said heat exchange structures, respectively, and means for clamping said first and said second grid structures together, whereby heat exchange fluid passing in communication with said fins is prevented by said gasket means from entering the region between said grid structures.

11. In a thermoelectric heat exchange apparatus, a support member formed from thermally and electrically conductive material, a pair of spaced layers of thermoelectric material, one of said layers being mounted on one surface of said support member, a heat exchange structure including a base member and a plurality of spaced laterally extending fins, said base being secured to said one thermoelectric layer, means including said base forming an electrically conductive path between said one thermoelectric layer and the other of said thermoelectric layers, a pair of grid means positioned on opposite sides of said support means, said grid means being secured together with said support means clamped therebetween, one of said grid means having an opening formed therein, said spaced fins projecting through said opening, and gasket means positioned adjacent said opening to prevent the flow of a fluid medium which passes in engagement with said fins from passing into the region between said grid means.

No references cited.

WINSTON A. DOUGLAS, *Primary Examiner.*

A. BEKELMAN, *Assistant Examiner.*